United States Patent
Roberts et al.

(10) Patent No.: US 6,668,513 B2
(45) Date of Patent: Dec. 30, 2003

(54) STRUCTURAL COMPOSITE MEMBER FORMED OF A METAL AND REINFORCED BY A BLOW-MOLDED MEMBER

(75) Inventors: Ronald Kemble Roberts, Dearborn, MI (US); Daniel P. Reed, Warren, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 9 days.

(21) Appl. No.: 09/951,694

(22) Filed: Sep. 12, 2001

(65) Prior Publication Data

US 2003/0047837 A1 Mar. 13, 2003

(51) Int. Cl.[7] ............................................. E04C 3/30
(52) U.S. Cl. .................... 52/735.1; 52/738.1; 52/730.5; 52/731.6; 296/208; 296/70
(58) Field of Search ........................ 52/735.1, 730.3, 52/736.3, 738.1, 730.4, 730.5, 731.6; 296/901, 208, 193.02, 70

(56) References Cited

U.S. PATENT DOCUMENTS

| | | | |
|---|---|---|---|
| 3,054,636 A | * 9/1962 | Wessells, III | 296/204 |
| 3,470,598 A | 10/1969 | Berthelsen | |
| 4,288,896 A | 9/1981 | West et al. | |
| 4,440,434 A | * 4/1984 | Celli | 296/185 |
| 4,457,547 A | * 7/1984 | Sekiyama et al. | 293/110 |
| 4,708,351 A | * 11/1987 | Midooka et al. | 277/184 |
| 4,863,771 A | * 9/1989 | Freeman | 428/36.1 |
| 5,190,803 A | 3/1993 | Goldbach et al. | |
| 5,656,353 A | 8/1997 | Butler | |
| 5,672,405 A | 9/1997 | Plank, Jr. et al. | |
| 5,823,602 A | 10/1998 | Kelman et al. | |
| 5,846,634 A | 12/1998 | Werth et al. | |
| 5,888,600 A | * 3/1999 | Wycech | 428/35.9 |
| 6,096,403 A | * 8/2000 | Wycech | 428/122 |
| 6,311,452 B1 | * 11/2001 | Barz et al. | 52/735.1 |
| 6,471,285 B1 | * 10/2002 | Czaplicki et al. | 296/188 |

FOREIGN PATENT DOCUMENTS

EP      0 272 334 A1    6/1988

* cited by examiner

Primary Examiner—Carl D. Friedman
Assistant Examiner—Basil Katcheves
(74) Attorney, Agent, or Firm—Brinks Hofer Gilson & Lione

(57) ABSTRACT

The present invention is generally directed towards a structural member formed from a sheet metal reinforced with blow-molded member. The sheet metal is in form of a channel with three sides. The blow-molded member has a first portion that contours the three sides of the channel and a second portion that is connected to the first portion to define a hollow interior. The sheet metal has a plurality of openings such that the blow-molded member forms a retention bulb around the openings.

23 Claims, 5 Drawing Sheets

STRUCTURAL COMPOSITE MEMBER FORMED OF A METAL AND REINFORCED BY A BLOW-MOLDED MEMBER

TECHNICAL FIELD OF THE INVENTION

This invention relates to a structural member formed of a metal and reinforced by a blow-molded member. More specifically, this invention relates to a structural member made of stamped metal that has blow-molded hollow plastic in the interior of the stamped metal.

BACKGROUND OF THE INVENTION

Today's automotive design seeks new methods of manufacturing lighter components having increased structural rigidity. Such lightweight components find use in automotive components such as vehicle seats, cross bar, support brackets, etc. It is also desirable to reduce the number of components in vehicles such that one component performs more than one function. With regard to vehicle cross car beams, much effort has previously focused on utilizing the structural integrity of the outboard register ducts to support the substrate. These previous designs typically required significant reinforcement with an additional steering column support bracket.

SUMMARY OF THE INVENTION

In accordance with the preferred embodiment of the present invention, a structural member is formed of a stamped metal. Preferably the sheet metal defines a channel having three sides. A blow-molded member reinforces the sheet metal. The blow-molded member consists of a first portion that contours the three sides of the channel and a second portion connected to the first portion such that blow-molded member defines a hollow interior. The hollow interior of the tubular member allows air to pass through the structural member such that the structural member can perform more than one function.

In order to bond the sheet metal to the blow-molded member, the sheet metal is provided with a plurality of openings. The blow-molded member forms retention member around the plurality of openings such that the sheet metal is mechanically bonded to the blow-molded member. Additionally, the blow-molded member encapsulates a protruding flange of the sheet metal.

BRIEF DESCRIPTION OF THE DRAWINGS

Further features of the invention will become apparent from the following discussion and the accompanying drawings in which.

DETAILED DESCRIPTION OF THE PREFERRED EMBODIMENT

Figure 1:
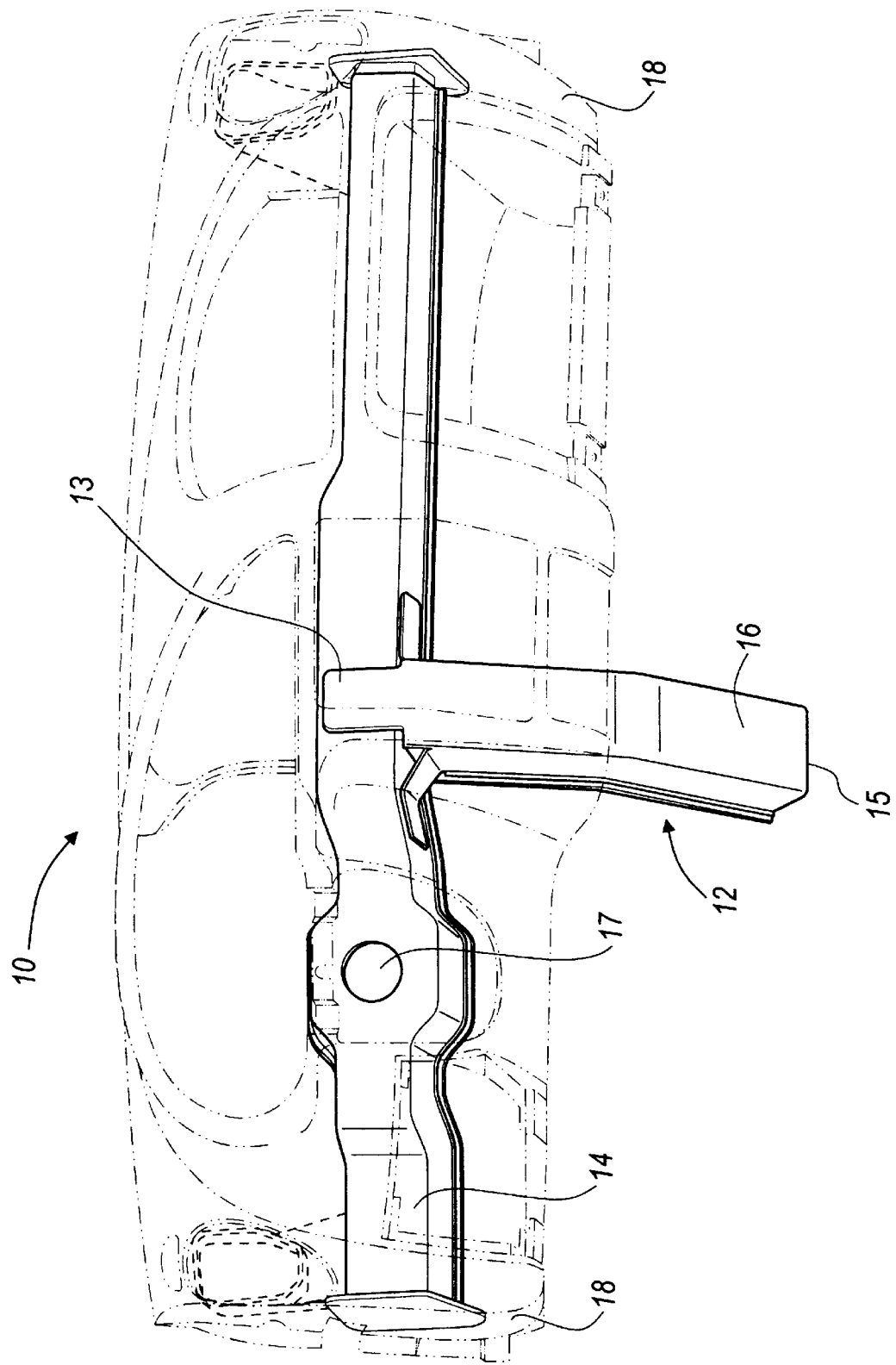
FIG. 1 is a front view of the instrument panel as installed in a motor vehicle in accordance with the teachings of the present invention.

The following description of the preferred embodiment is merely exemplary in nature and is in no way intended to limit the invention or its application or uses.

Referring in particular to the drawings, an instrument panel incorporating the reinforced structural member of the present invention in accordance with the teachings of the present invention is designated by reference numeral 10.

Figure 2:
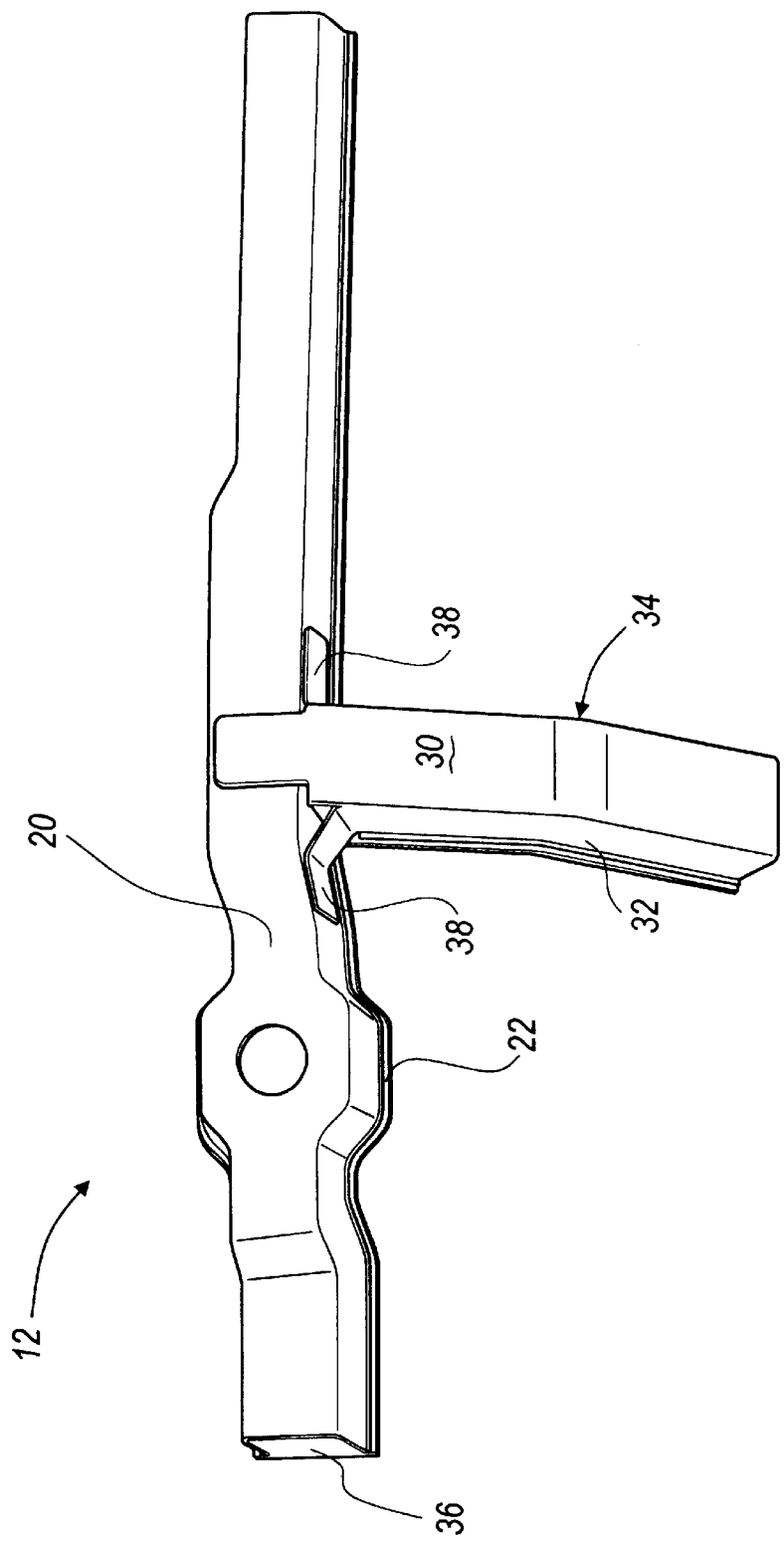
FIG. 2 is a front view of the structural member in accordance with the teachings of the present invention.

As shown in FIG. 1, the instrument panel 10 is installed in the interior of a motor vehicle and includes a structural member 12. The structural member 12 consists of cross bar 14 and a support bracket 16. The cross bar 14 extends horizontally across the interior of the motor vehicle. The cross bar 14 extends from one A pillar 18 to another A pillar 18. Additionally, the cross bar 14 has an aperture 17, as shown in FIGS. 1 and 2, to accommodate a steering wheel. Alternatively, the cross bar 14 may have additional stamping to attach different components such as a glove compartment, an audio system, a display for the climate control, a passenger airbag, etc.

The support bracket 16 is positioned substantially perpendicular to the cross bar 14 and serves as a support means for the cross bar 14. The support bracket 16 at one end 13 is attached to the cross bar 14 and at the other end 15 is attached to the floor (not shown) of the motor vehicle. The structural member 12 forms the backbone of the instrument panel 10 and is covered with foam or resin to give the instrument panel 10 an aesthetic look.

Figure 3:
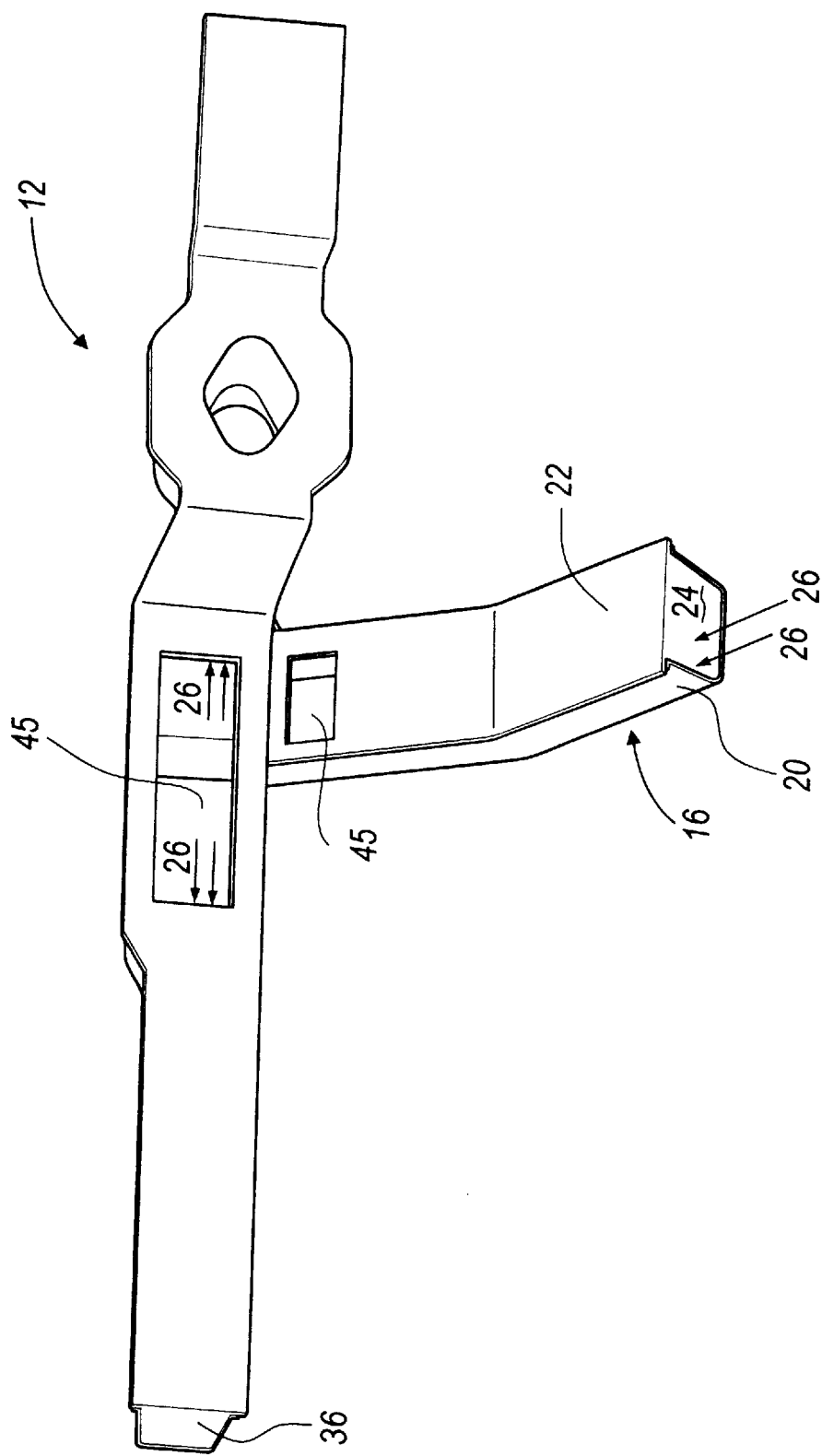
FIG. 3 is a back view of the structural member having the blow-molded member in accordance with the teachings of the present invention.
Figure 4:
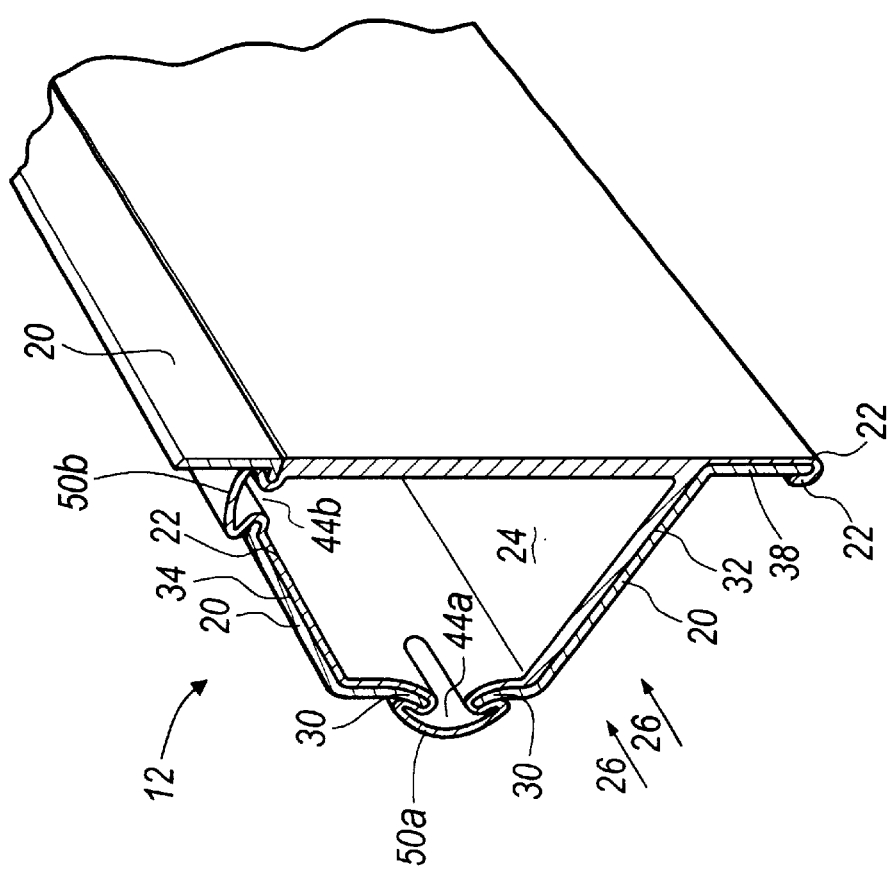
FIG. 4 is a front perspective view of the structural member in accordance with the teachings of the present invention.

As shown in FIGS. 2, 3 and 4, the structural member 12 is formed of a sheet metal 20 and a blow-molded member 22. The blow-molded member 22 provides structural integrity to the structural member 12. Preferably, the blow-molded member 22 has a hollow interior 24 such that air, shown by arrows 26 (in FIG. 4) flows through the structural member 12.

Although in the drawings an instrument panel 10 incorporating the structural member 12 having a cross beam 14 and support bracket 16 is shown and described, it must be understood that the structural member 12 is not limited to be used exclusively in this arrangement. The structural member 12 can be used in a variety of components in a motor vehicle. For example, it may be used as a duct for the air conditioning unit in a car, or fluid in the radiator support. Alternatively, the structural member may be used in other application not relating to motor vehicles such as routing for electrical lines in a building walls etc.

As shown in FIGS. 2 and 3, the sheet metal 20 is in form of a channel having three sides. Preferably the sheet metal 20 has a "C shaped" cross-section. Alternatively, the sheet metal 20 may have any other shape depending on the motor vehicle component. As shown in FIG. 2, the sheet metal 20 defines a base 30 and a plurality of sides 32 and 34 axially extending from the base 30. Preferably, the sides 32 and 34 are substantially parallel to each other such that they define an interior surface or channel 36.

Referring in particular to FIG. 4 the sheet metal 20 also includes at least one flange 38 extending from the sides 32 or 34 of the sheet metal 20. Alternatively, the sheet metal 20 may or may not include the flange 38. As will be explained later, the blow-molded member 22 will encapsulate a portion of the flange 38 to bond the sheet metal 20 to the blow-molded member 22. Preferably, the sheet metal 20 has a thickness of about 0.5 mm to 1.5 mm. Preferably, the sheet metal 20 is selected from a group consisting of aluminum, iron, copper or alloys thereof.

Figure 5:
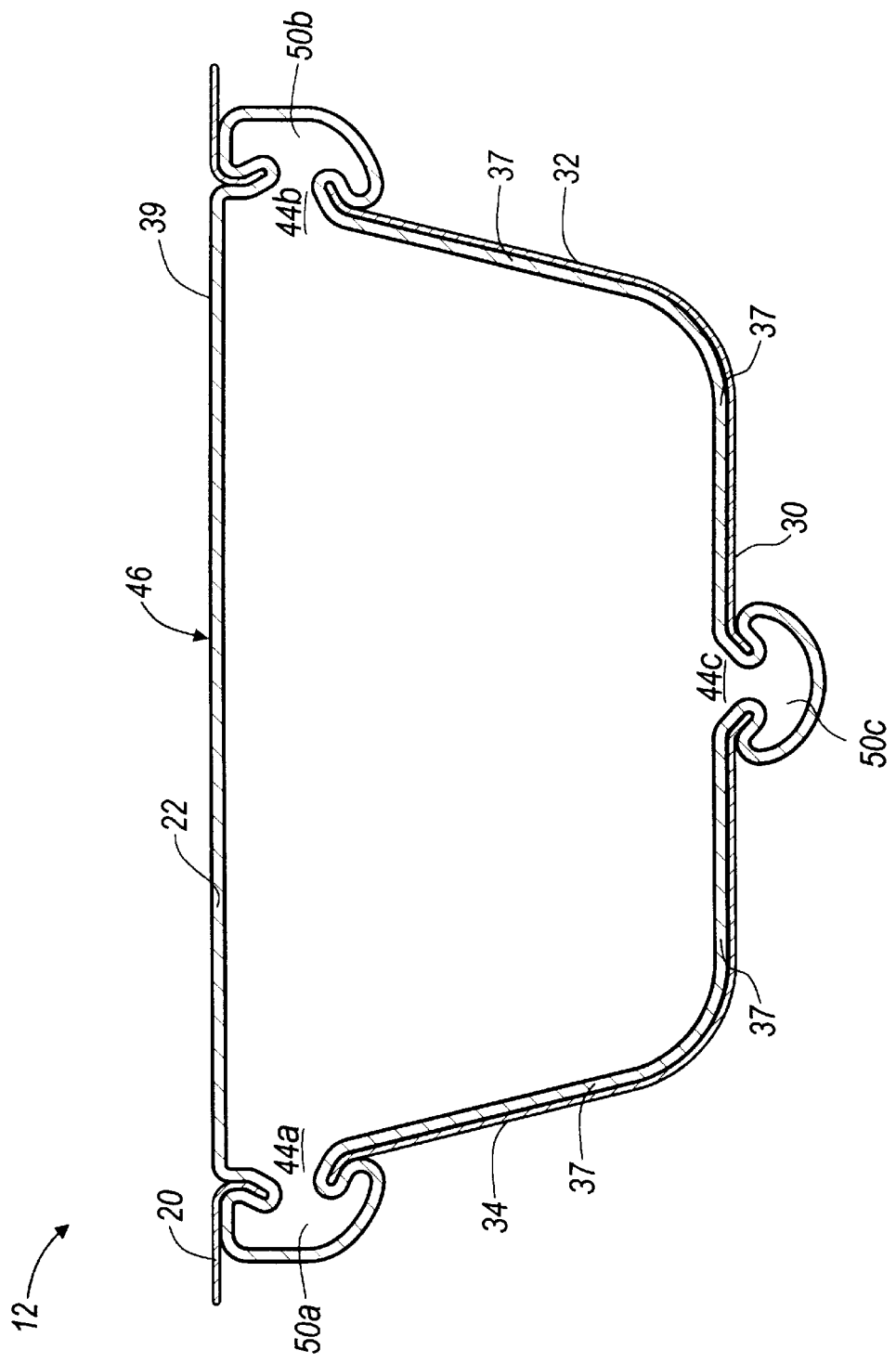
FIG. 5 is a cross sectional view of the structural member with the retention bulbs in accordance with the teachings of the present invention.

As shown in FIGS. 4 and 5, the sheet metal 20 includes a plurality of openings or apertures 44a, 44b and 44c. These openings 44a, 44b and 44c may be formed in the base 30 or on either sides 32 or 34 of the sheet metal 20. Preferably, the openings 44a, 44b and 44c are formed by punching the sheet metal 20. As will be explained later these openings 44a, 44b and 44c will help bond the sheet metal 20 to the blow-molded member 22.

As shown in the FIGURES and explained above, the structural member 12 also comprises a blow-molded member 22. The blow-molded member 22 provides structural rigidity to the sheet metal 20. As shown in FIGS. 3 and 4, the blow-molded member 22 fills the interior space 36 of the sheet metal 20.

Referring in particular to FIGS. 4 and 5, the blow-molded member 22 has a first portion 37 and a second portion 39. As seen in the FIGURES, the first portion 37 of the blow-molded member 22 contours the base 30 and the sides 32 and 34 of the sheet metal 20. The second portion 39 is connected to the first portion 37 and forms a top surface 46 between the sides 32 and 34 such that the top surface 46 of the blow-molded member 22 is substantially parallel to the base 30 of the sheet metal 20. The first portion 37 and the second portion 39 define the hollow interior 24 inside the blow-molded member 22. Preferably, the first portion 37 and the second portion 39 are formed as one integral piece. Preferably, the blow-molded member 22 is in form of a hollow tubular member disposed inside the sheet metal 20 such that air can pass through the structural member 12. Preferably, the blow-molded member 22 is selected from a group consisting of thermoplastic resin such as PET or nylon. Alternatively, as shown in FIG. 2, the structural member 12 may have predefined openings 45 such that they provide air to enter the structural member 12 from these openings 45. Preferably the blow-molded member 22 has a thickness of about 0.1 mm to about 6 mm. Alternatively, the blow-molded member 22 may have ribs (not shown) to strengthen the structural member 12.

As shown in FIGS. 4 and 5, in order to bond the sheet metal 20 to the blow-molded member 22, the sheet metal 20 is provided with a plurality of openings 44a, 44b and 44c. Although in the drawings only 3 openings are shown in the sheet metal 20, it must be understood that either more than 3 or less than 3 gaps may be present in the sheet metal 20. The blow-molded member 22 forms a retention bulb 50a, 50b and 50c between the openings 44a, 44b and 44c respectively. The retention bulb 50a, 50b and 50c provide the necessary mechanical bond to hold the sheet metal 20 the blow-molded member 22 together. To further bond the sheet metal 20 and the blow-molded member 22, the blow-molded member 22 is molded over the flange 38 (as shown in FIG. 4) such that a portion of the flange 38 is encapsulated between the blow-molded members 22.

In order to bond the sheet metal 20 to the blow-molded member 22 the following process is followed. A pre stamped sheet metal 20 is placed in a blow-molding tool. The blow-molding tool used in the present invention is conventional in the art. The material to form the blow-molded member 22 in its molten form is directed inside the interior surface 36 of the sheet metal 20. Due to the presence of the openings 44a, 44b and 44c, the molten form of the material flows through the openings 44a, 44b and 44c. The molten form of the material is then blow-molded using traditional blow-molding techniques, to form the blow-molded member 22 having a hollow interior disposed in the interior 36 of the sheet metal 20. In addition retention bulbs 50a, 50b and 50c are formed when the excess material in the molten form flows into the openings 44a, 44b and 44c. Further, the molten material may also mold over the flange 38 such that a portion of the flange 38 is encapsulated between the blow-molded member 22.

As any person skilled in the art will recognize from the previous description and from the figures and claims, modifications and changes can be made to the preferred embodiment of the invention without departing from the scope of the invention as defined in the following claims.

What is claimed is:

1. A structural member comprising:
   a channel member having three sides;
   at least one opening defined in one of the sides of the channel member;
   a blow-molded member disposed and retained within the channel member;
   wherein the blow-molded member has a first portion and a second portion, the first portion extending along the three sides of the channel; the second portion connected to the first portion to define a hollow member within the channel member; and
   the blow-molded member extending through the at least one opening in one of the sides of the channel member to define a retention bulb sized larger than the at least one opening to connect the channel member and the blow-molded member.

2. The structural member of claim 1, further comprising a second opening in one of the sides of the channel member and a second retention bulb extending through the second opening.

3. The structural member of claim 2, wherein the retention bulb mechanically bonds the channel member to the blow-molded member.

4. The structural member of claim 1, wherein the channel member includes a C-shaped cross-section defined by the three sides.

5. The structural member of claim 1, wherein the channel member is selected from a group consisting of aluminum, iron, copper or alloys of aluminum, cooper or iron thereof.

6. The structural member of claim 1, wherein the blow-molded member is selected from a group of thermoplastic resin.

7. The structural member of claim 1, wherein the channel member has a thickness in the range of 0.5 mm to 1.5 mm.

8. The structural member of claim 1, wherein the blow-molded member has a thickness of 1 mm to 6 mm.

9. The structural member of claim 1, wherein the channel member has a flange portion protruding outwards from one of the three sides.

10. The structural member of claim 9, wherein the blow-molded member encapsulates a part of the flange portion such that the channel member and the blow-molded member are bonded.

11. A structural member installed in a motor vehicle comprising:
   a channel member having three sides;
   a first opening and a second opening defined in first and second sides of the channel member, respectively;
   a blow-molded member disposed within the channel member;
   wherein the blow-molded member has a first portion and a second portion, the first portion extending along the three sides of the channel; and
   first and second retention bulbs formed by the blow-molded member extending through the first and second openings such that the channel member and the blow-molded member are mechanically bonded together.

12. The structural member of claim 11, wherein the channel member has a C-shaped cross-section defined by the three sides.

13. The structural member of claim 11, wherein the channel member is outwardly opening to define an open fourth side, and wherein the second portion spans the open fourth side.

14. The structural member of claim 11, wherein the blow-molded member is selected from a group consisting of thermoplastic resin.

15. The structural member of claim 11, wherein the channel member has a thickness in the range of 0.5 mm to 1.5 mm.

16. The structural member of claim 11, wherein the blow-molded member has a thickness of 1 mm to 6 mm.

17. The structural member of claim 11, wherein the channel member has a flange portion protruding outwards from one of the three sides.

18. The structural member of claim 17, wherein the blow-molded member encapsulates a part of the flange portion such that the channel member and the blow-molded member are bonded.

19. A method of forming a structural member in a motor vehicle, the method comprising the steps of:

providing a channel member having three sides;

providing a blow-molded member disposed inside the channel member such that the blow-molded member forms a hollow tube in the channel member;

providing at least one gap in one of the three sides; and providing means to mechanically bond the channel member to the blow-molded member by way of the at least one gap.

20. The method of claim 19, wherein the step of providing means to mechanically bond the channel member to the blow-molded member consists the steps of:

forming a retention bulb in a portion of the blow-molded member, the retention bulb disposed outside the channel member.

21. The method of claim 19, wherein the step of providing means to mechanically bond the channel member to the blow-molded member additionally consists the steps of:

providing a flange portion protruding outwards from one of the three sides; and encapsulating a part of the flange portion by the blow-molded member such that the blow-molded member and the channel are mechanically bonded.

22. The method of claim 19, further comprising selecting the channel member from a group consisting of aluminum, copper, iron or alloy thereof.

23. The method of claim 19, further comprising selecting the blow-molded member from a group of thermoplastic resin.

* * * * *